(12) United States Patent
Benoît et al.

(10) Patent No.: US 6,530,626 B1
(45) Date of Patent: Mar. 11, 2003

(54) FIELD-REPAIR DEVICE FOR A RUBBER-BAND TRACK

(75) Inventors: Daniel Benoît, Québec (CA); Mark Delisle, Québec (CA); Stéphane Gauthier, Québec (CA); Gilles Soucy, Québec (CA)

(73) Assignee: Soucy International Inc. (CA)

( * ) Notice: Subject to any disclaimer, the term of this patent is extended or adjusted under 35 U.S.C. 154(b) by 0 days.

(21) Appl. No.: 09/589,820

(22) Filed: Jun. 7, 2000

Related U.S. Application Data

(60) Provisional application No. 60/138,018, filed on Jun. 8, 1999.

(51) Int. Cl.$^7$ .............................................. B62D 55/205
(52) U.S. Cl. ......................... 305/157; 305/165; 305/60; 29/402.01; 29/402.09
(58) Field of Search ................................. 305/157, 158, 305/165, 182, 186, 60; 29/402.01, 402.09, 402.14, 402.15; 474/256

(56) References Cited

U.S. PATENT DOCUMENTS

| | | | | |
|---|---|---|---|---|
| 2,739,017 A | * | 3/1956 | Arps ........................... | 305/182 |
| 2,803,504 A | * | 8/1957 | Lynch ......................... | 305/157 |
| 3,602,364 A | | 8/1971 | Maglio et al. ............... | 198/193 |
| 3,734,221 A | | 5/1973 | Labelle ........................ | 180/5 R |
| 3,799,627 A | * | 3/1974 | Zwieg ......................... | 305/165 |
| 3,833,998 A | * | 9/1974 | Tomlinson ................... | 29/402.01 |
| 4,262,972 A | | 4/1981 | Falk | |
| 4,840,438 A | | 6/1989 | Cory | |
| 4,844,560 A | | 7/1989 | Edwards et al. | |
| 4,861,120 A | | 8/1989 | Edwards et al. | |
| 4,953,920 A | * | 9/1990 | Jager .......................... | 305/182 |
| 5,005,921 A | | 4/1991 | Edwards et al. | |
| 5,415,913 A | * | 5/1995 | Clevenger, Jr. ......... | 474/256 X |
| 5,511,869 A | | 4/1996 | Edwards et al. | |
| 5,641,213 A | | 6/1997 | Arsenault | |
| 5,964,018 A | * | 10/1999 | Moody .................... | 29/402.09 |

* cited by examiner

*Primary Examiner*—Russell D. Stormer
(74) *Attorney, Agent, or Firm*—Bourque & Associates, PA

(57) ABSTRACT

The device (10) is used for temporarily repairing a ruptured or otherwise damaged rubber-band track (50) of a vehicle and allow the vehicle to proceed on its own to the nearest maintenance site or to a convenient location where replacement or permanent repair of the track (50) can be undertaken. A method for temporarily repairing a damaged rubber-band track (50) is also disclosed. The device (10) comprises a plurality of spaced-apart and parallel support members (12), each being transversely disposed on the exterior side (50a) of the track (50). A plurality of linking members (18) is extending between corresponding ends of two adjacent support members (12) and are pivotally connected to each adjacent linking member (18). A plurality of track retention members (30) maintain the device (10) on the track (50). Damaged portions of the track (50) are also positively secured to the device (10) by fasteners or the like to prevent them from moving. The present invention allows a track (50) to be temporarily repaired even if one or a few sections are missing. If necessary, more than one device (10) can be installed on the same track (50).

11 Claims, 7 Drawing Sheets

FIELD-REPAIR DEVICE FOR A RUBBER-BAND TRACK

CROSS REFERENCE TO RELATED APPLICATION

The present application claims the benefit of U.S. provisional patent application serial No. 60/138,018, filed Jun. 8, 1999, which is hereby incorporated by reference.

BACKGROUND

The present invention relates to a device used for temporarily repairing a damaged rubber-band track of a vehicle and which allows the vehicle to proceed on its own to the nearest maintenance site or to a convenient location where the replacement or permanent repair of the track can be undertaken. A method for temporarily repairing a damaged rubber-band track is also disclosed.

Many modern tanks and other military vehicles, as well as some off-highway utility vehicles, are supported on the ground by a set of tracks made of a strong composite material and provided as endless bands. Rubber-band tracks have many advantages over their conventional metallic counterparts. For instance, they are less noisy, they generate less vibration and require less maintenance since they are not an assembly of a plurality of parts. Rubber-band tracks are less likely to cause damages to roads or structures on which they travel, when compared to conventional metallic tracks. However, a rubber-band track can rupture or be otherwise damaged due to a defect in the material, wear or fatigue. A track may also be damaged by an object on which it travels. In the case of a military vehicle, a track may be damaged by a mine, a nearby explosion or a projectile. In all instances, the affected vehicle is likely to be useless unless a repair is done in the field, even if no section of the track is missing or if the track is not extensively damaged.

A replacement in the field of a damaged track with a new one is not always possible, especially if the damage occurred in a hostile territory or in a location which is difficult to access. Yet, some military tanks can weight 60 tons or more. Replacing a track on such vehicles requires the presence of heavy lifting equipments that will have to be dispatched wherever the vehicle is located.

There is thus a need to have a field-repair device and a corresponding method for temporarily but suitably repairing a ruptured or otherwise damaged rubber-band track without interfering with the driving system of the track so that the vehicle can proceed on its own to the nearest maintenance site or to a convenient location where replacement or permanent repair of the track can be undertaken.

There is also a need for a device and a corresponding method for temporarily repairing a ruptured or otherwise damaged track without having to puncture the belting of the track between the exterior and interior side thereof.

SUMMARY

The object of the present invention is to fulfill the above-identified needs and to allow a ruptured or otherwise damaged track to be temporarily repaired where the vehicle is located.

More particularly, the present invention provides a device for temporarily repairing a damaged rubber-band track, the track extending in a longitudinal direction and having an exterior ground-engaging side and an interior side. The device is characterized in that it comprises:

a plurality of spaced-apart and parallel support members, each support member having two ends and being to be transversely disposed on the exterior side of the track with reference to the longitudinal direction;

a plurality of linking members, each respectively extending parallel to the longitudinal direction between corresponding ends of two adjacent support members;

first means for pivotally connecting each linking member to the corresponding ends of two respective and adjacent support members;

a plurality of track retention members, each connected to a corresponding end of a respective support member and projecting inwardly to define a track retention space; and second means for positively securing the damaged region of the track to the device.

The present invention also provides a method for temporarily repairing a damaged rubber-band track, the track extending in a longitudinal direction and having an exterior ground-engaging side and an interior side. The method is characterized in that it comprises the steps of:

a) positioning a repair device on the exterior side of the track and with reference to a damaged region thereof; and b) securing the device to the track.

BRIEF DESCRIPTION OF THE FIGURES

The present invention will be better understood from the following detailed description and appended figures in which.

DETAILED DESCRIPTION

Figure 1:
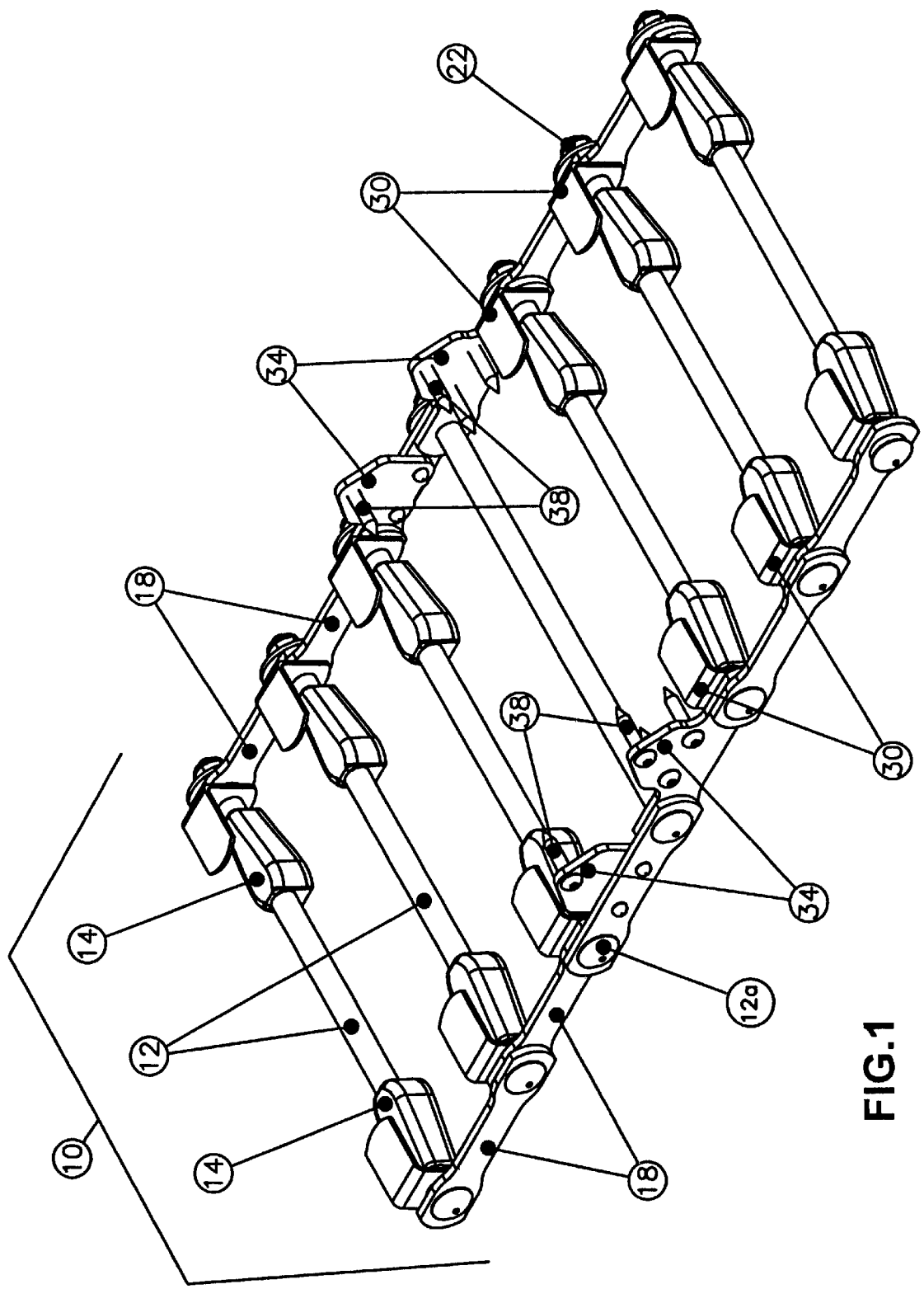
FIG. 1 is an upper perspective view of a field-repair device according to a preferred embodiment of the present invention.

The appended figures show an example of a device (10) according to the present invention. FIG. 1 shows the device (10) alone, while FIGS. 2 to 6 show the device (10) mounted on a typical rubber-band track (50). Other models are also possible, depending on the kind and the extent of the damage as well as the model of track. Unless otherwise indicated, the various parts of the device (10) are preferably made of metal.

The track (50) is in the form of an endless band which extends in a longitudinal direction that corresponds to the normal driving direction of the vehicle. It has an exterior ground-engaging side (50a) and an interior side (50b). The exterior side (50a) is provided with a tread (51) encased with the material of the track (50) and which provides adequate traction on the ground. The interior side (50b) shows a plurality of repeated sections, each comprising drive lug or lugs (52). Each section of the illustrated track (50) also comprises a central guide horn (54). However, guide horns (54) are not always present on all tracks. The guide horn (54)

is separated from the drive lugs (52) of the illustrated track (50) by corresponding flat strips (56). The drive lugs (52) serve as anchoring points for the sprocket wheels of the track driving system (not shown). The purpose of the guide horns (54) is to maintain the track (50) in a proper alignment when the application requires it, depending on the side load applied to the track (50) in working conditions. The flat strips (56) are used as a track for the road wheels (not shown) on which rest the weight of the vehicle.

Each section of the track (50) is separated from an adjacent section by a small region having less material to allow the track (50) to bend more easily. Of course, the parts of the interior side (50b) of the track (50) are configured and disposed to allow the track (50) to bend at least up to the smallest curvature around which it has to run.

Figure 7:
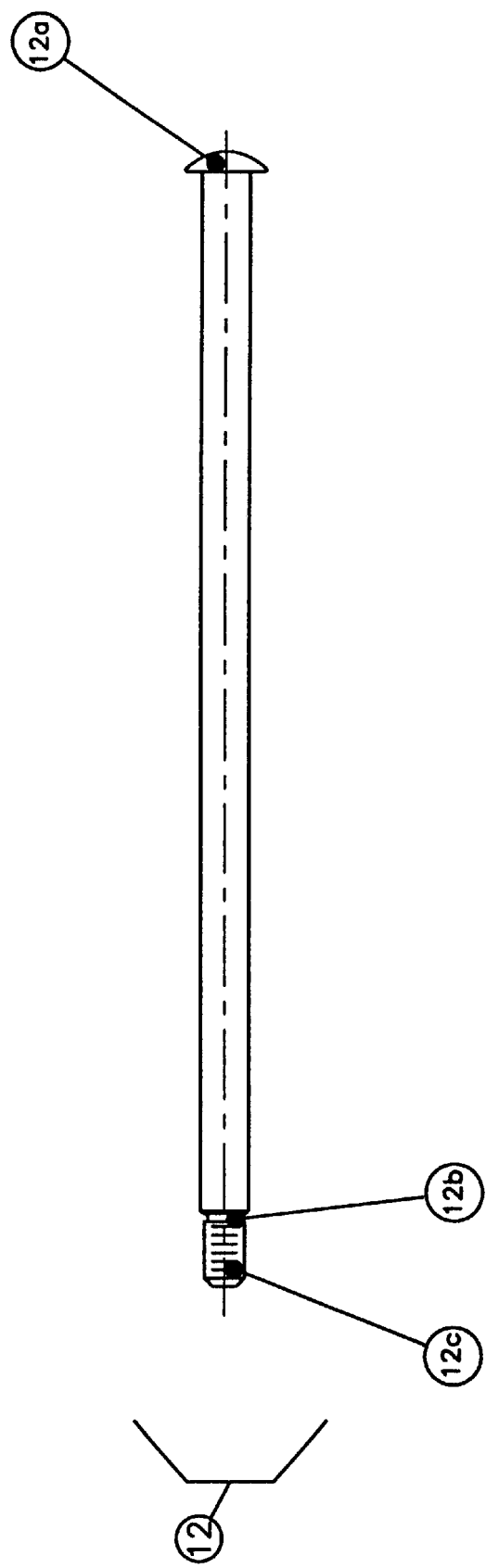
FIG. 7 is a side view of an individual support member such as the ones used in the device of FIG. 1.

The device (10) comprises a plurality of spaced-apart and parallel support members (12). Their exact number depends on the extent of the damage and the type or the size of the vehicle. Each support member (12) is preferably in the form of an elongated rigid rod whose length is substantially equivalent to the width of the track (50) to be repaired. The support member (12) can also be slightly sorter than the width of the track (50). FIG. 7 shows the preferred aspect of a support member (12). The support member (12) comprises a forged head (12a), a recessed portion (12b) and a threaded end (12c) adjacent to the recessed portion (12b).

Figure 2:
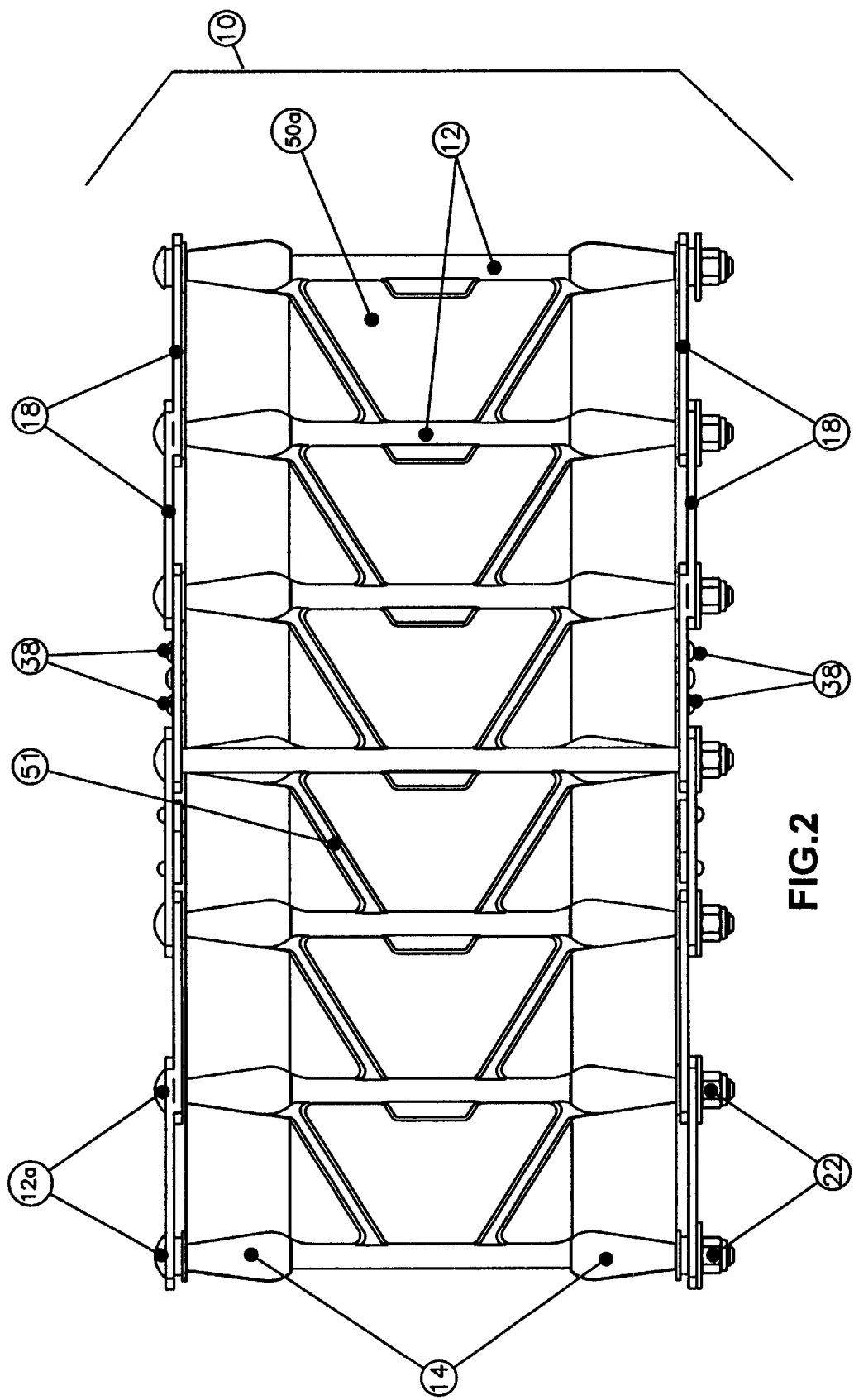
FIG. 2 is a bottom view of a ruptured rubber-band track on which is mounted the device of FIG. 1.
Figure 3:
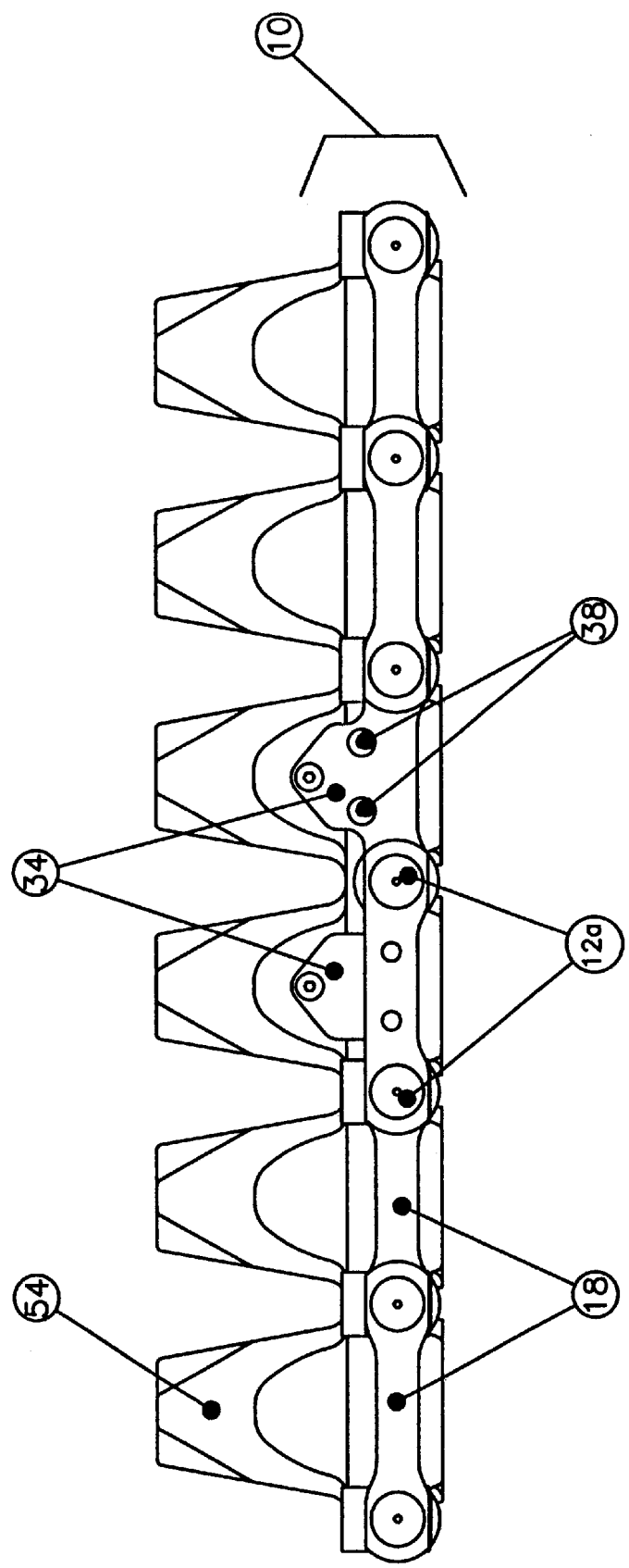
FIG. 3 is a side view of the rubber-band track and the device shown in FIG. 2.

In use, as shown in FIG. 2, the support members (12) are disposed on the exterior side (50a) of the track (50). The ends of the support members (12) are connected together by means of two parallel sets of linking members (18). The spacing between support members (12) is equivalent to the distance between a number of successive drive lugs (52), which is generally two. The distance could possibly be more than two successive drive lugs (52) or even slightly less so as to create a small interference that will further hold the parts together. Yet, the distance between some support members (12) may be different from others, depending on the needs.

In the preferred embodiment, there is an odd number of support members (12) and the central support member (12) is the one designed to be aligned with the center of the damaged region of the track (50). The central support member (12) could be omitted or designed to be removed if necessary since it may interfere with remnant pieces of material that are typical of a badly damaged region of a track (50).

The linking members (18) of each set are pivotally interconnected one after the other and form an articulated linkage that is adjacent to a respective side edge of the track (50). Means are also provided for pivotally connecting each linking member (18) to the corresponding end of an adjacent support member (12). In the preferred embodiment, each linking member (18) is in the form of an elongated plate that partially overlaps an adjacent one. Each plate comprises two opposite holes at the ends thereof. Two corresponding holes of adjacent linking members (18) are in registry with each other and a corresponding support member (12) is inserted through them. The linking members (18) at the opposite end are connected in a similar way and are aligned with the recessed portion (12b). A nut (22) is inserted on the threaded end (12c) of the support member (12) to lock the parts in place. It should be noted that the threaded end (12c) and the nut (22) can be replaced by any other arrangement capable of achieving the same result. The parts are configured and disposed to allow a pivot interconnection between the linking members (18). This allows the device (10) to follow the curvature of the track (50) when the vehicle is in movement or to install the device (10) in a curved portion of the track (50). Other arrangements for connecting the linking members (18) are also possible, including for instance bolts (not shown) that are to be inserted in a threaded hole made in the center of a corresponding support member (12). Yet, another kind of articulated linkage may be used, such as steel cables, flexible strips of a plastic material or any other similar arrangements, as apparent to a person skilled in the art, all of which provide a pivot interconnection between the integral segments forming the linking members (18).

Figure 4:
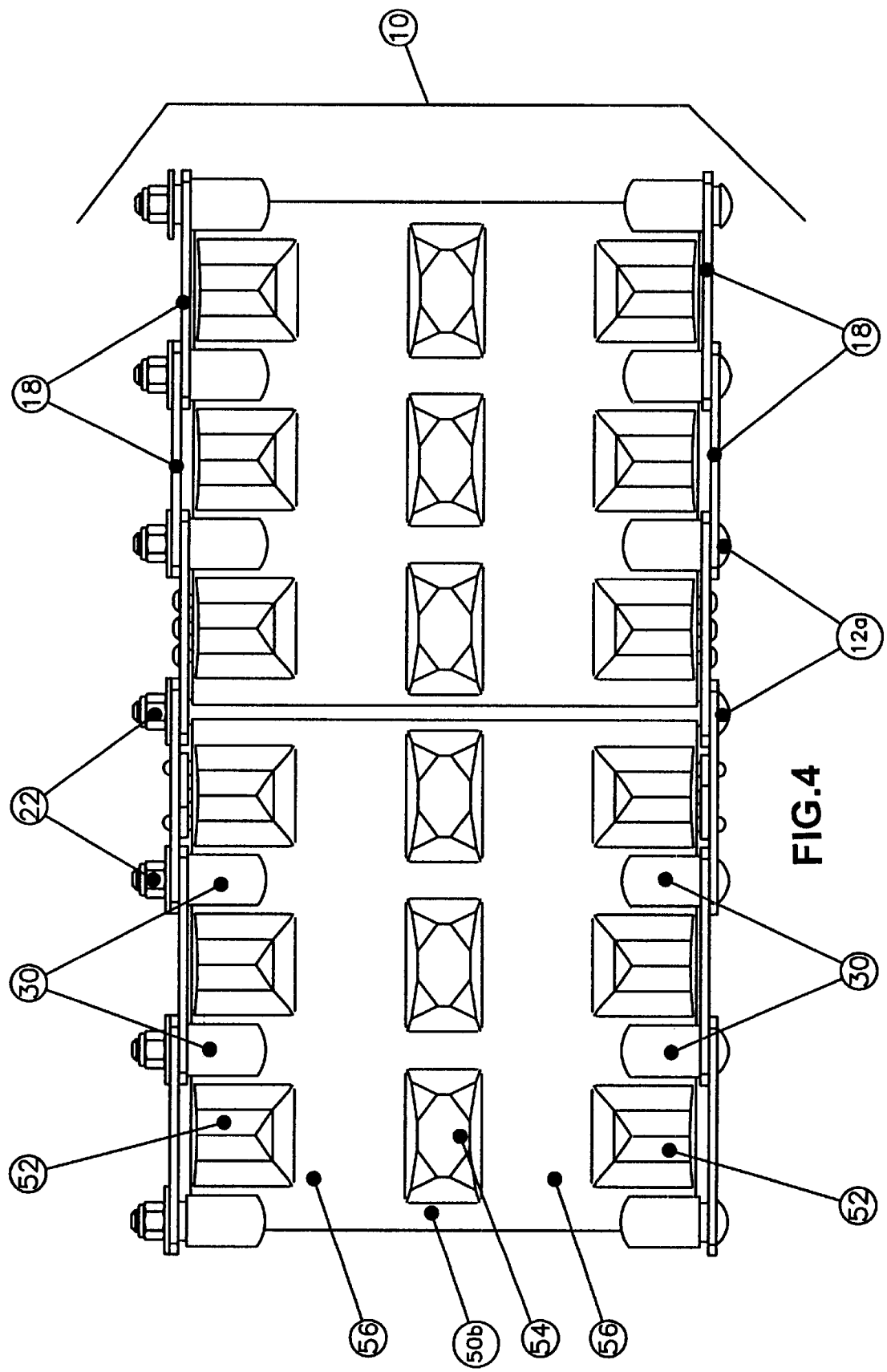
FIG. 4 is an upper view of the rubber-band track and the device shown in FIG. 2.
Figure 5:
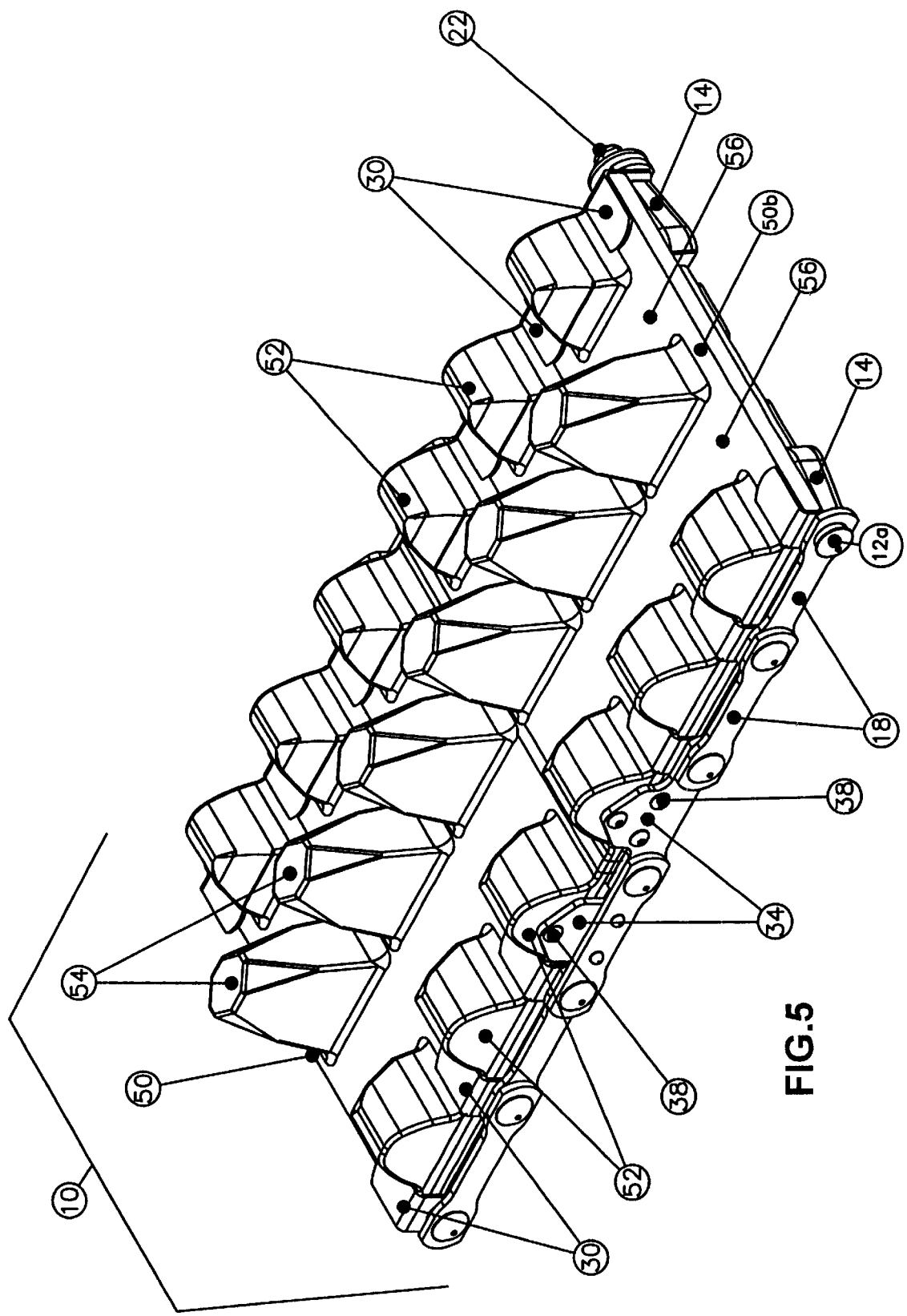
FIG. 5 is a perspective view of the interior side of the rubber-band track and of the device shown in FIG. 2.
Figure 6:
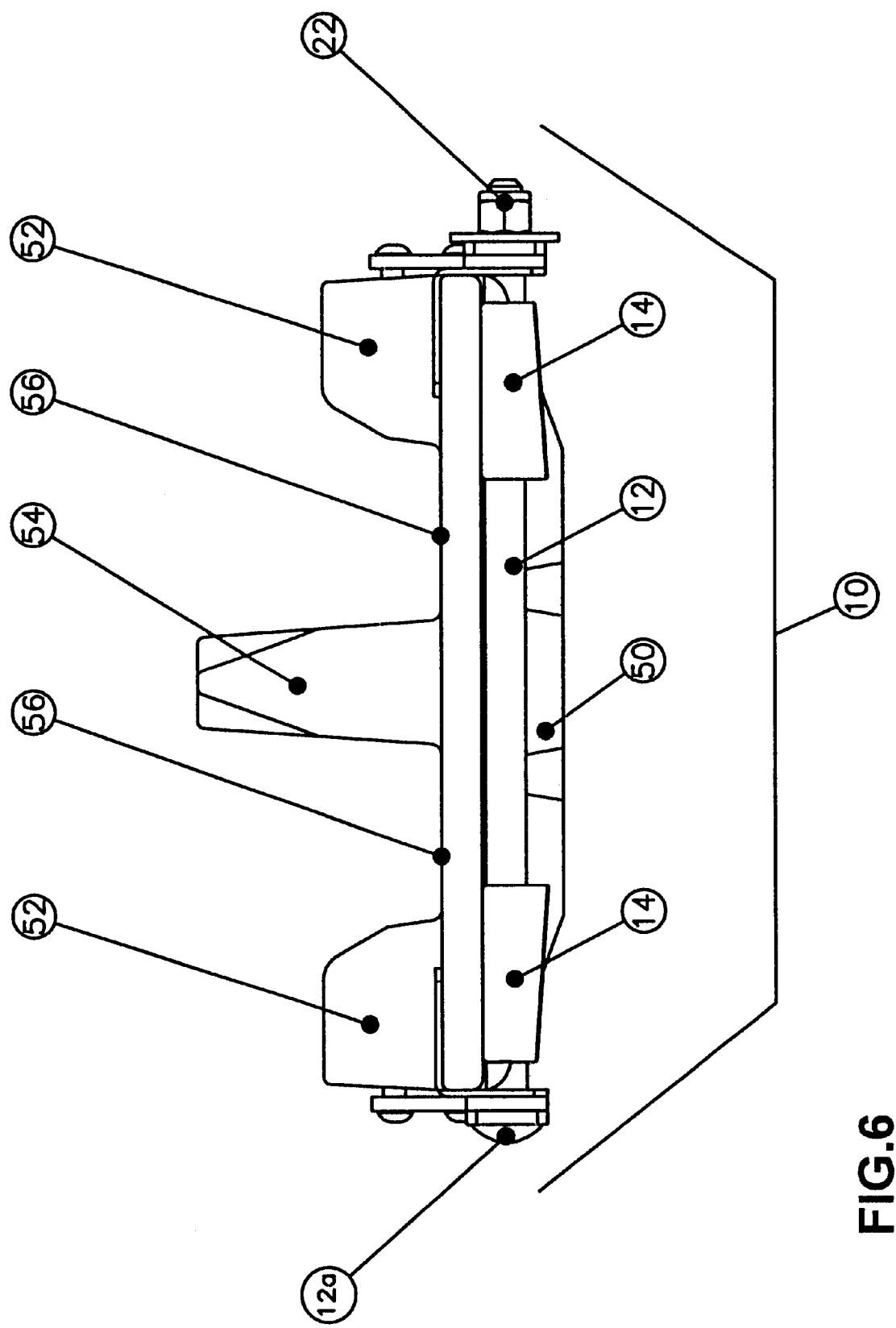
FIG. 6 is a front view of the rubber-band track and the device shown in FIG. 2.

The device (10) also comprises two sets of L-shaped track retention members (30) that are connected to or near a respective end of the support members (12). These track retention members (30) have a free end that is projecting inwardly. Each track retention member (30) defines a track retention space with the corresponding support member (12) and in which the track (50) is to be retained. The purpose of the track retention members (30) is to be in engagement with the corresponding side edge and the interior side (50b) of the track (50) in order to maintain the device (10) in place. As shown in FIG. 4, the track retention members (30) are located in the space between two successive drive lugs (52). The shape and size of the track retention members (30) should allow them to fit in that space while not significantly interfering with the flexibility of the track (50) or the track driving system. The track retention members (30) are preferably directly pivotally connected to the support members (12) by a hole in which a corresponding support member (12) is inserted.

The track retention members (30) can be omitted at certain locations. For example, in the preferred embodiment, there are no tongue members (30) aligned with the central support member (12) which is to be aligned with the center of the damaged region on the track (50). Omitting these tongue members (30) avoid the possible interferences with the remnant pieces of damaged material. Yet, tongue members (30) could possibly be provided at alternate locations instead of opposite ends of each support member (30).

The device (10) is further provided with means for positively securing the device (10) to the boundaries of the damaged region of the track (50). These means are especially important in the case of a ruptured or nearly ruptured track (50) since the two sides around the crack may eventually bend toward the center, interfere with the driving system of the track (50) and then be forced out of the device (10). Preferably, the means comprise upright projecting flanges (34) and screws (38) to be inserted in a corresponding hole made through the flanges (34). The flanges (34) either are a separate piece secured to a respective linking member (18) or made integral therewith. The flanges (34) are configured and disposed so that the screws (38) can be inserted on the side of the track (50), preferably on the side of a drive lug (52). The screws (38) are preferably inserted into a tapered hole made when installing the device (10). Screws (38) should be inserted in each damaged region of the track (50) from both sides. It should be noted that the screws (38) can be replaced by bolts, nails, pins or any other suitable fasteners.

Additional flanges (34) and screws (38) can be provided at more locations, especially if one or more sections of the track (50) are missing. In this case, the device (10) would be used as a link between the free ends of the track (50) and maintain them in place.

In the preferred embodiment, a block (14) is provided at each end of the support members (12). The main purpose of the blocks (14) is to prevent the support members (12) from bending and to distribute the load toward the sides of the track (50). The blocks (14) are slid on the support members (12) and are preferably made of a highly-resistant plastic material. Other materials can be used as well. It should be noted that there are no blocks (14) on the central support member (12) to prevent them from interfering with the possible remnant pieces of damaged material of the track (50). Yet, the blocks (14) can possibly be made integral with the support members (12).

The device (10) is preferably installed with the parts removed from one end of each support member (12). This allows the device (10) to be transversely inserted on the track (50) from the interior. The device (10) is then pushed sidewards until the track retention members (30) of the interior side are fully in place. The other sets of linking members (18), track retention means (30), nuts (22) and all other parts of the exterior side of the device (10) are installed by hand from the exterior. Of course, other methods of installation are possible, depending for example on the situation in the field and the design of the device (10) to be installed. Once repaired, the vehicle is allowed to proceed at on its own to the nearest maintenance site or to a convenient location where the replacement of the damaged track (50) can be undertaken.

The present invention can be advantageously used for temporarily repairing of a ruptured or otherwise damaged rubber-band track of almost any kind of vehicle with an internal track driving system, for instance off-highway utility vehicles, snowmobiles, tanks and other military vehicles. It can also be used to reinforce a region of a track (50) that show signs of a possible rupture or crack before it actually happens. The device (10) is then positioned on where the track (50) may rupture. If necessary, more than one device (10) can be installed on the same track (50). Another advantage of the present invention is that the belting of the track (50) does not need to be punctured between the interior and exterior side thereof, which greatly simplifies the installation of the device (10).

Although a preferred embodiment of the invention has been described in detail herein and illustrated in the accompanying figures, it is to be understood that the invention is not limited to this precise embodiment and that various changes and modifications may be effected therein without departing from the scope or spirit of the present invention.

What is claimed is:

1. A device for temporarily repairing a damaged rubber-band track, the track extending in a longitudinal direction and having an exterior ground-engaging side and an interior side, the device comprising:

a plurality of spaced-apart and parallel support members, each support member having two ends and being to be transversely disposed on the exterior side of the track with reference to the longitudinal direction;

a plurality of linking members, each respectively extending parallel to the longitudinal direction between corresponding ends of two adjacent support members;

first means for pivotally connecting each linking member to the corresponding ends of two respective and adjacent support members;

a plurality of track retention members, each connected to a corresponding end of a respective support member and projecting inwardly to define a track retention space; and second means for positively securing the damaged region of the track to the device.

2. A device according to claim 1, wherein each support member comprises a rigid rod having a length substantially equivalent to the width of the track.

3. A device according to claim 1, wherein each linking member comprises an elongated rigid plate.

4. A device according to claim 1, wherein each track retention member comprises a L-shaped tongue pivotally connected to the corresponding support member.

5. A device according to claim 1, wherein the second means comprise a plurality of fasteners to connect the linking members to the sides of the track.

6. A device according to claim 5, wherein the second means further comprise a plurality of upright projecting flanges connected to respective linking members, each flange having at least one hole for receiving a corresponding fastener.

7. A device according to claim 6, wherein the fasteners are screws.

8. A device according to claim 1, further comprising a plurality of blocks, each mounted around a corresponding end of a corresponding support member.

9. A method for temporarily repairing a damaged rubber-band track, the track extending in a longitudinal direction and having an exterior ground-engaging side and an interior side, the method comprising the steps of:

a) positioning the device for temporarily repairing a damaged rubber-band track of claim 1 on the exterior side of the track over a damaged region thereof; and b) securing the device to the track.

10. A method according to claim 9, wherein the step of securing the device to the track comprises the step of positively securing the device to the track using fasteners as said second means for positively securing the damaged region of the track to the device.

11. A method according to claim 9, wherein in step b), the device is secured to the track without puncturing the track.

* * * * *